US010527099B2

(12) United States Patent
Abe et al.

(10) Patent No.: US 10,527,099 B2
(45) Date of Patent: Jan. 7, 2020

(54) MAGNET FLUID SEALED BEARING UNIT AND DRIVE MOTOR HAVING THE BEARING UNIT

(71) Applicant: GLOBERIDE, Inc., Tokyo (JP)

(72) Inventors: Yutaro Abe, Tokyo (JP); Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 183 days.

(21) Appl. No.: 15/681,547

(22) Filed: Aug. 21, 2017

(65) Prior Publication Data

US 2018/0058503 A1 Mar. 1, 2018

(30) Foreign Application Priority Data

Aug. 30, 2016 (JP) ................................ 2016-167789

(51) Int. Cl.
*F16C 33/76* (2006.01)
*H02K 1/17* (2006.01)
(Continued)

(52) U.S. Cl.
CPC ............ *F16C 33/765* (2013.01); *H02K 1/17* (2013.01); *H02K 5/10* (2013.01); *H02K 5/124* (2013.01); *F16C 2380/26* (2013.01); *F16J 15/43* (2013.01)

(58) Field of Classification Search
CPC .... F16C 33/765; F16C 35/073; F16C 35/077; F16C 2380/26; F16C 33/7846;
(Continued)

(56) References Cited

U.S. PATENT DOCUMENTS 6,530,535 B2 * 3/2003 Oishi .................. A01K 89/006 242/295
9,408,376 B2 * 8/2016 Ohara ................ F16C 32/0406
(Continued)

FOREIGN PATENT DOCUMENTS

CN 105317848 A 2/2016
EP 2979545 A2 2/2016
(Continued)

OTHER PUBLICATIONS

Office Action dated Dec. 4, 2018 issued in corresponding Chinese Patent Application No. 201710696000.3 with English translation.
(Continued)

*Primary Examiner* — Emily P Pham
(74) *Attorney, Agent, or Firm* — DLA Piper LLP (US)

(57) ABSTRACT

Provided is a magnetic fluid sealed bearing unit that provides excellent handling ease and workability in incorporating the bearing unit into a rotary shaft portion and exhibits a stable sealing capability. A magnetic fluid sealed bearing unit of the present invention has an inner ring and an outer ring, each made of a magnetic material, a plurality of rolling members interposed between the inner ring and the outer ring, a magnetic seal mechanism arranged between the inner ring and the outer ring and configured to inhibit entry of foreign substances toward the plurality of rolling members, a non-magnetic inner ring-side support member fitted and retained on the inner ring, and a non-magnetic outer ring-side support member fitted and retained on the outer ring.

6 Claims, 5 Drawing Sheets

(51) Int. Cl.

| | |
|---|---|
| ***H02K 5/10*** | (2006.01) |
| ***H02K 5/124*** | (2006.01) |
| *F16J 15/43* | (2006.01) |

(58) Field of Classification Search
CPC ........ F16C 33/7889; F16J 15/43; H02K 1/17; H02K 5/10; H02K 5/124
See application file for complete search history.

(56) References Cited

U.S. PATENT DOCUMENTS

| | | | | |
|---|---|---|---|---|
| 9,611,892 | B2 * | 4/2017 | Nagata | A01K 89/01122 |
| 2002/0191878 | A1 * | 12/2002 | Ueda | C23C 8/02 384/492 |
| 2003/0094215 | A1 * | 5/2003 | Tanaka | C23C 8/02 148/217 |
| 2015/0063733 | A1 * | 3/2015 | Ohara | F16C 19/06 384/446 |
| 2015/0115088 | A1 | 4/2015 | Toma | |
| 2015/0122930 | A1 * | 5/2015 | Ohara | F16C 33/765 242/321 |
| 2016/0032979 | A1 | 2/2016 | Nagata et al. | |
| 2016/0309689 | A1 | 10/2016 | Ohara | |
| 2017/0058955 | A1 * | 3/2017 | Ohara | F16C 33/765 |

FOREIGN PATENT DOCUMENTS

| | | | |
|---|---|---|---|
| JP | H02-53268 | U | 4/1990 |
| JP | 2-168835 | A | 6/1990 |
| JP | 2012-44946 | A | 3/2012 |
| JP | 2014-161300 | A | 9/2014 |
| JP | 2015-010673 | A | 1/2015 |
| JP | 2015-082976 | | 4/2015 |
| JP | 2015-084712 | | 5/2015 |
| JP | 2016-031114 | | 3/2016 |
| SU | 781469 | A1 | 11/1980 |

OTHER PUBLICATIONS

Extended European Search Report EP Application No. 17188538.7 dated Jan. 25, 2018.

Second Office Action dated Jul. 19, 2019, of counterpart Chinese Application No. 201710696000.3, along with an English translation.

Notice of Reasons for Refusal dated Nov. 8, 2019, of counterpart Japanese Application No. 2016-167789, along with an English translation.

* cited by examiner

MAGNET FLUID SEALED BEARING UNIT AND DRIVE MOTOR HAVING THE BEARING UNIT

This application is based on and claims the benefit of priority from Japanese Patent Application Serial No. 2016-167789 (filed on Aug. 30, 2016), the contents of which are hereby incorporated by reference in their entirety.

TECHNICAL FIELD

The present invention relates to a magnetic fluid sealed bearing unit that rotatably supports a rotary shaft and prevents foreign substances such as dust and water from entering inside, and to a drive motor provided with said bearing unit.

BACKGROUND

Generally, a bearing is arranged in a rotary shaft portion installed in various types of drive force transmission mechanisms or a rotary shaft (output shaft) portion of a drive motor. Typically, as such a bearing, a so-called ball bearing is often used that houses therein a plurality of rolling members (rolling elements) between an inner ring and an outer ring along a circumferential direction thereof, and this type of bearing is used so that rotation performance of a rotary shaft can be improved.

As disclosed in, for example, Japanese Patent Application Publication No. 2015-10673, the above-described type of bearing is known to have a configuration in which a magnetic fluid seal mechanism is incorporated thereinto (a magnetic fluid sealed bearing) in order to prevent foreign substances such as dust and water from entering inside. The magnetic fluid seal mechanism incorporated into this bearing is configured as follows. That is, a ring-shaped magnet is mounted on an outer peripheral surface of the inner ring or an inner peripheral surface of the outer ring as a fixed side to form a magnetic circuit, and a magnetic fluid is retained in a gap on an opposite side (a gap on the inner peripheral surface of the outer ring or a gap on the outer peripheral surface of the inner ring) so as to prevent foreign substances from entering the rolling members.

Furthermore, there is also known a configuration in which the magnetic seal mechanism is not incorporated into the bearing itself but is arranged so as to protect the bearing arranged between a rotary shaft and a housing portion such as a frame. For example, Japanese Patent Application Publication No. 2014-161300 (the '300 Publication) discloses a drive motor having a configuration in which, with respect to a bearing arranged between a frame (a housing) and a drive shaft of the drive motor for an electric reel, a flange portion is formed integrally with the frame, and a magnetic seal mechanism that retains a magnetic fluid between itself and the drive shaft is arranged in the flange portion so as to prevent foreign substances from entering the bearing.

A magnetic fluid sealed bearing as described above is configured so that a magnetic fluid is retained by a magnetic circuit formed by a magnet, and, therefore, care should be taken when handling it and incorporating it into a rotary shaft portion. For example, when the magnetic fluid sealed bearing is placed in a portion having magnetism, such as a metallic work table, there is a possibility that the magnetic circuit is affected, causing the magnetic fluid to flow out. To avoid this, it is also conceivable to inject the magnetic fluid after the magnetic fluid sealed bearing has been incorporated into the rotary shaft portion. This, however, deteriorates incorporation workability.

Furthermore, when, as disclosed in the '300 Publication, the magnetic seal mechanism is arranged in the frame of the drive motor adjacently to the bearing of the drive motor, a magnetic circuit formed by a magnet in the magnetic seal mechanism is affected by the frame made of a magnetic material and thus becomes no longer stable. Thus, in order to stably retain a magnetic fluid in a predetermined gap portion, a magnetic circuit should be formed to be stable.

SUMMARY

The present invention has been made to address the above-described problem, and an object of the present invention is to provide a magnetic fluid sealed bearing unit that provides excellent handling ease and workability in incorporating the bearing unit into a rotary shaft portion and exhibits a stable sealing capability. Furthermore, another object of the present invention is to provide a drive motor into which a magnetic fluid sealed bearing unit capable of forming a stable magnetic circuit is incorporated.

In order to achieve the above-described objects, a magnetic fluid sealed bearing unit according to the present invention is characterized by having an inner ring and an outer ring, each made of a magnetic material, a plurality of rolling members interposed between the inner ring and the outer ring, a magnetic seal mechanism arranged between the inner ring and the outer ring and configured to inhibit entry of foreign substances toward the plurality of rolling members, a non-magnetic inner ring-side support member fitted and retained on the inner ring, and a non-magnetic outer ring-side support member fitted and retained on the outer ring.

In the magnetic fluid sealed bearing unit configured as above, between the inner and outer rings, the magnetic seal mechanism is arranged, and the plurality of rolling members are sealed. The non-magnetic inner ring-side support member is fitted to and retained in the inner ring, and the non-magnetic outer ring-side support member is fitted to and retained on the outer ring. Therefore, when the bearing unit thus configured is mounted between a rotary shaft and a frame, the inner ring and the outer ring can be moderately separated from the frame by the inner ring-side and outer ring-side support members, respectively, and this suppresses a phenomenon in which a magnetic circuit is affected by the frame (affected by magnetic flux leakage or the like). As a result, performance of the magnetic circuit is stabilized, thus making it possible to stably retain a magnetic fluid in a gap. Furthermore, the support members thus configured are fitted to and retained in the inner ring and on the outer ring, respectively, and formed beforehand into a unit. Therefore, even in a case of injecting a magnetic fluid beforehand, it becomes possible to prevent the magnetic fluid from being dissipated when being handled, and moreover, a quality in mounting the bearing unit to (a quality in incorporating the bearing unit into) the rotary shaft portion is improved.

Furthermore, in order to achieve the above-described objects, a drive motor according to the present invention is characterized by having a motor component including a housing, a magnet housed in the housing, a rotor driven to rotate by an electromagnetic action between itself and the magnet and having a rotary shaft mounted therein, and a bearing rotatably supporting the rotary shaft. The bearing is formed of the above-described bearing unit. Further, the outer ring-side support member is arranged between the outer ring and the housing, and the inner ring-side support member is arranged between the inner ring and the rotary shaft.

According to the above-described drive motor, in the bearing into which the magnetic seal mechanism is incorporated, the non-magnetic support members are arranged between the outer ring and the housing and between the inner ring and the rotary shaft, respectively. Therefore, each of the inner ring and the outer ring can be moderately separated from the motor component. This suppresses a phenomenon in which a magnetic circuit is affected by the motor component. As a result, performance of the magnetic circuit is stabilized, thus making it possible to stably retain a magnetic fluid in a gap.

It may also be possible that the above-described magnetic seal mechanism is installed on each of both sides of the rolling members as a constituent component of the bearing or installed only on one of the both sides of the rolling members. Moreover, it may also be possible that the magnet (a retaining plate retaining the magnet) as a constituent component of the magnetic seal mechanism is fixed on the outer ring or on the inner ring.

Advantages

According to the present invention, there is provided a magnetic fluid sealed bearing unit that provides excellent handling ease and workability in incorporating the bearing unit into a rotary shaft portion and exhibits a stable sealing capability. Furthermore, according to the present invention, there is provided a drive motor into which a magnetic fluid sealed bearing unit capable of forming a stable magnetic circuit is incorporated.

DESCRIPTION OF THE PREFERRED EMBODIMENTS

Figure 1:
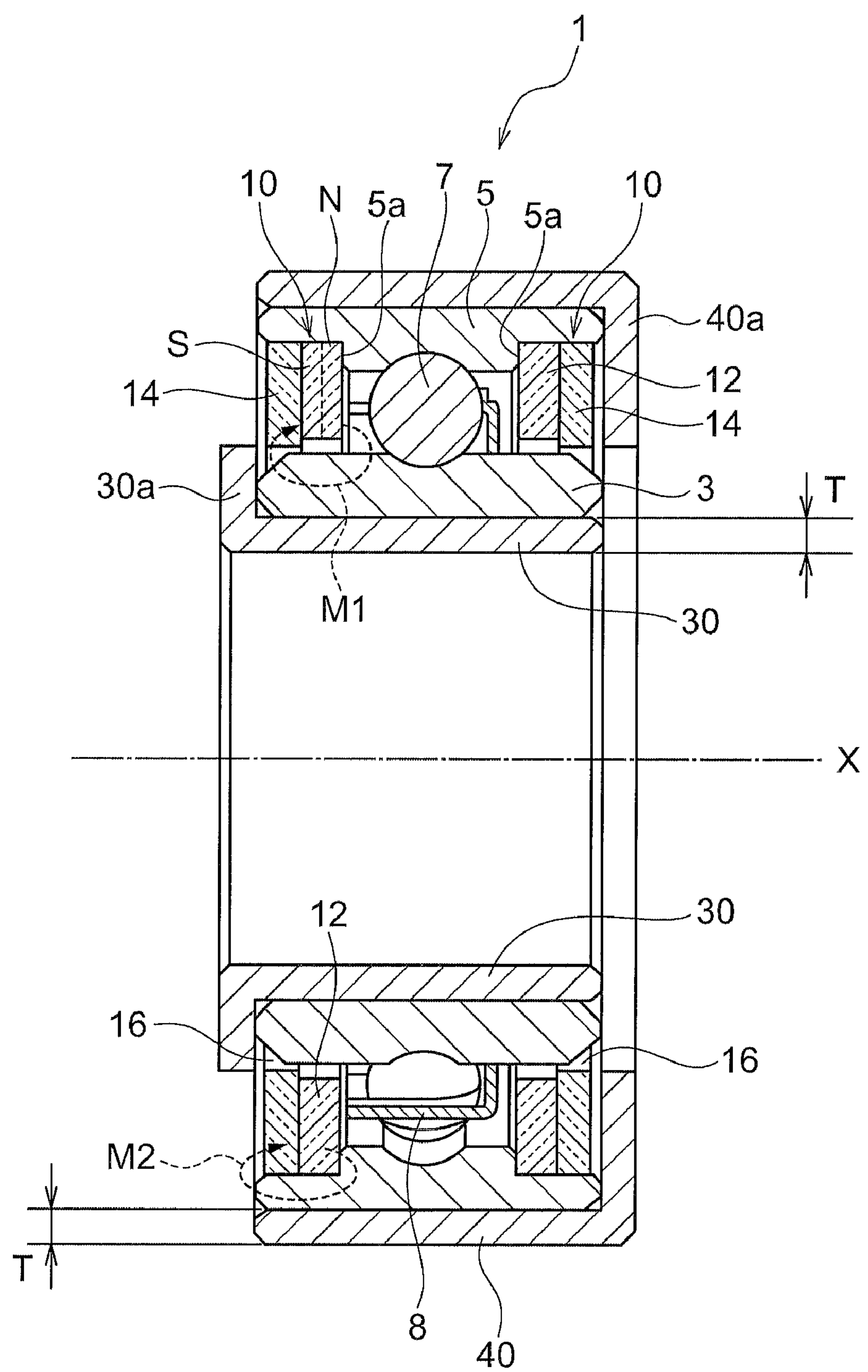
FIG. 1 is a central sectional view showing one embodiment of a magnetic fluid sealed bearing unit according to the present invention.
Figure 2:
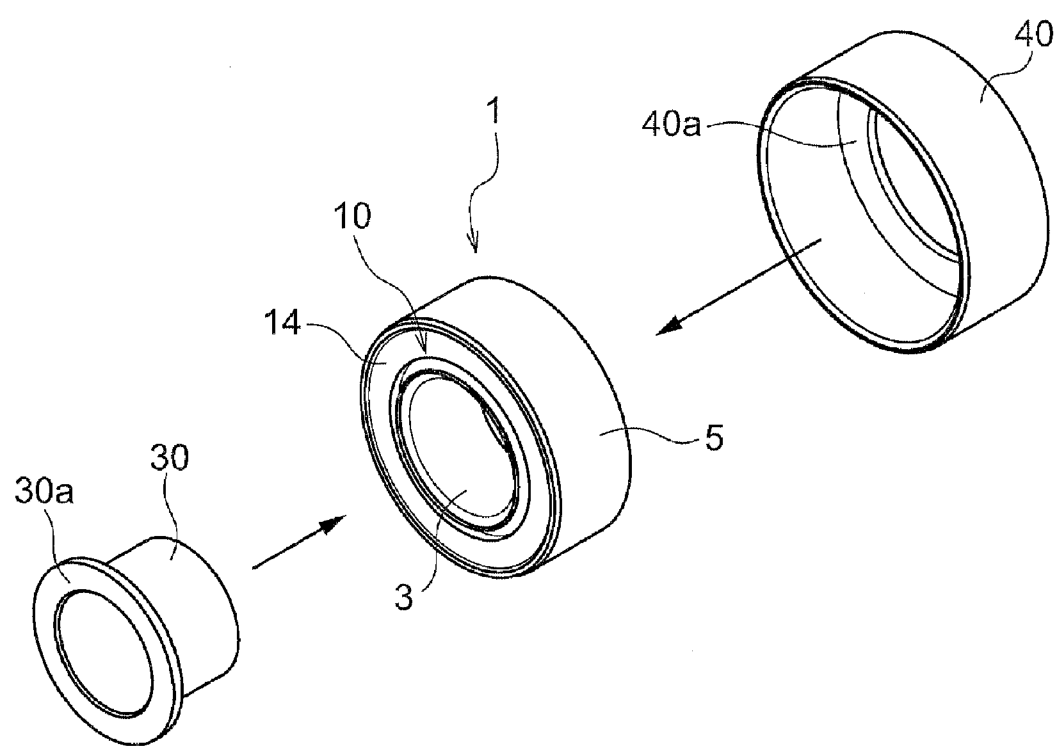
FIG. 2 is an exploded perspective view of the magnetic fluid sealed bearing unit shown in FIG. 1.
Figure 3:
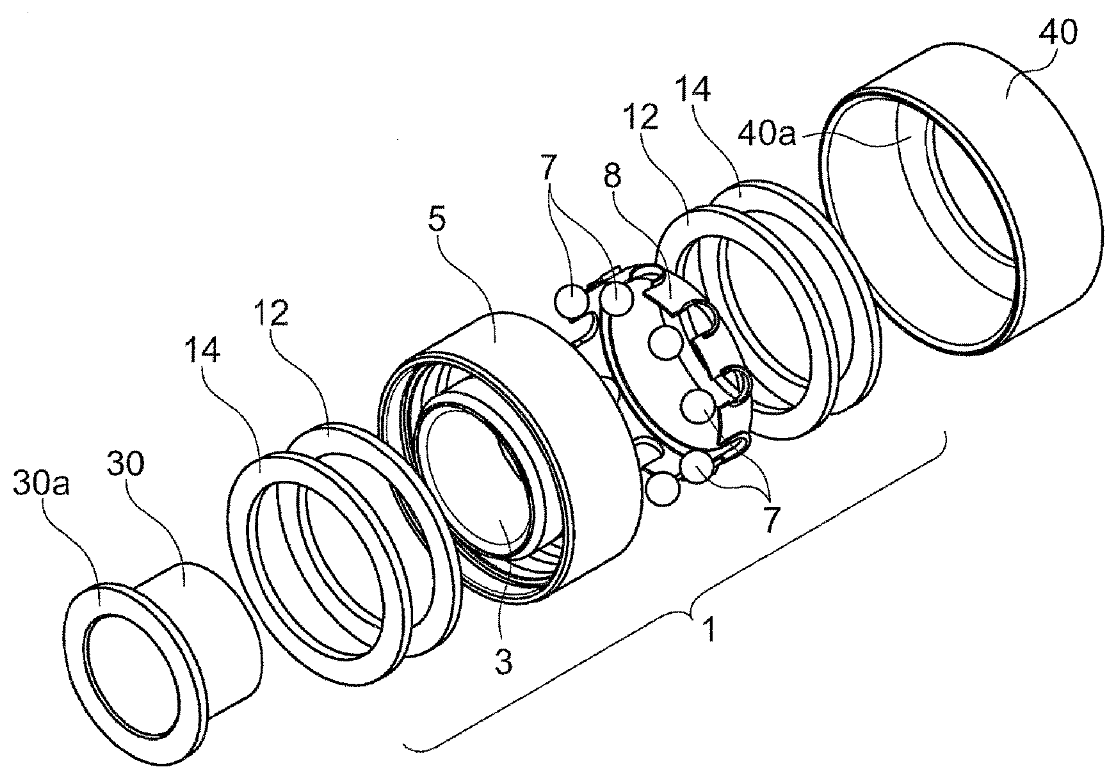
FIG. 3 is a perspective view, as exploded, of a bearing portion of the magnetic fluid sealed bearing unit shown in FIG. 2.

FIG. 1 to FIG. 3 are views showing one embodiment of a magnetic fluid sealed bearing unit according to the present invention. FIG. 1 is a central sectional view thereof, FIG. 2 is an exploded perspective view of the magnetic fluid sealed bearing unit shown in FIG. 1, and FIG. 3 is a perspective view, as exploded, of a bearing portion of the magnetic fluid sealed bearing unit shown in FIG. 2.

A magnetic fluid sealed bearing unit (hereinafter, referred to also as a "bearing unit") 1 according to this embodiment may be provided with a cylindrical inner ring 3, a cylindrical outer ring 5 encircling the inner ring 3, and a plurality of rolling members (rolling elements) 7 interposed between the inner ring 3 and the outer ring 5. The rolling members 7 may be retained by an annular-shaped retainer (a retaining unit) 8 and allow the inner ring 3 and the outer ring 5 to rotate relative to each other.

The inner ring 3, the outer ring 5, and the rolling members 7 may be formed of a material having magnetism such as, for example, chrome-based stainless steel (SUS440C), and the retainer 8 may be formed of a highly corrosion-resistant and heat-resistant material such as, for example, a stainless steel material (SUS304). The rolling members 7 may not necessarily be magnetic bodies. Furthermore, the inner ring 3 and the outer ring 5 of this embodiment may be configured to be equal (or it may also be possible that they are substantially equal) in length in an axial direction (a direction of an axial center of a bearing) X. It may also be possible, however, that the outer ring 5 is elongated in the axial direction with respect to the inner ring 3, or the inner ring 3 is elongated in the axial direction with respect to the outer ring 5, in which case a magnetic seal mechanism described below is provided in an elongated portion thus formed.

On each of opening sides of the inner ring 3 and the outer ring 5, a magnetic seal mechanism (a magnetic fluid seal) 10 may be installed that inhibits entry of foreign substances toward the plurality of rolling members. While in this embodiment, the magnetic seal mechanisms 10 having the same configuration may be arranged at openings on both sides of the inner ring 3 and the outer ring 5, respectively, it may also be possible that such a magnetic seal mechanism is arranged only at one of the openings on both sides, or magnetic seal mechanisms having different configurations from each other are provided on the both opening sides, respectively.

The magnetic seal mechanism 10 may have a ring-shaped magnet (hereinafter, referred to also as a "magnet") 12, a ring-shaped pole plate (hereinafter, referred to also as a "pole plate") 14 having the magnet 12 attached to an axially inner side surface thereof, and a magnetic fluid 16 retained by a magnetic circuit formed by the magnet 12. In this embodiment, with an inner peripheral surface of the outer ring 5 set as a fixed side, the magnet 12 and the pole plate 14 may form a predetermined gap between themselves and an outer peripheral surface of the inner ring 3. That is, the predetermined gap may be formed between the outer peripheral surface of the inner ring 3 and the magnet 12 together with the pole plate 14, and the magnetic fluid 16 may be filled in this gap portion, so that there is provided a sealing capability to prevent entry of foreign substances into the rolling members 7.

As the magnet 12, there can be used a permanent magnet having a high magnetic flux density and high magnetism, such as, for example, a neodymium magnet prepared by sintering. The magnet 12 may be magnetized beforehand such that magnetic poles (an S-pole, an N-pole) thereof point to the axial direction (the direction of the axial center of the bearing)×(FIG. 1 shows how the magnet 12 of the magnetic seal mechanism 10 on a left side is magnetized). Furthermore, on an axially outer side surface of the magnet 12, the pole plate 14 may be arranged so as to be in contact with the magnet 12. The pole plate 14 may have a ring-shaped outer appearance shape that is substantially the same as the shape of the magnet 12 and may be formed of, for example, a material having magnetism such as chrome-based stainless steel (SUS440C). By this configuration, a magnetic circuit M1 as shown in the figure may be formed on an inner ring 3 side, and a magnetic circuit M2 as shown in the figure may be formed on an outer ring 5 side.

The magnetic fluid 16 retained by each of the magnetic circuits M1 and M2 may be prepared by dispersing magnetic fine particles of, for example, Fe3O4 in base oil using a surfactant and thus have viscosity and a property of reacting with a magnet when brought close thereto. That is, the magnetic fluid 16 thus described may be retained in the gap portion between the inner ring 3 and the magnet 12 together with the pole plate 14 to seal the gap, so that there is provided a function of preventing foreign substances from entering inside. In this case, such a magnetic circuit formed by the magnet 12 may be formed also on the outer ring 5 side as described above, and thus it may also be possible that the magnetic fluid 16 is previously filled in a minute gap between the inner peripheral surface of the outer ring 5 and the magnet 12.

In this embodiment, a step 5*a* may be formed on the inner peripheral surface of the outer ring 5 on a rolling member 7 side. Due to the presence of the step 5*a*, the outer ring 5 may include thin regions on the opening sides and a thick region on the rolling member 7 side, so that a distance between the inner ring 3 and the outer ring 5 is larger on axially outer sides than on an axially inner side. The step Sa may have a function of positioning and fixing the magnet 12 (the magnet 12 to which the pole plate 14 is attached; a pole plate formed into a unit together with a magnet) as the magnet 12 is inserted (fitted) from each of the opening sides so as to be mounted to a predetermined position and abuts against the step 5*a*.

The pole plate 14 may be attached to the magnet 12 so that a uniform gap is generated over an entire circumference between itself and the outer peripheral surface of the inner ring 3. In this case, the pole plate 14 may be formed to have such a size as to protrude in a radially inner side with respect to an inner ring-side edge surface of the magnet 12, and the magnet 12 may be formed so that, in a state where the magnet 12 is attached to the pole plate 14, a gap substantially equal in size to the above-described gap is generated between itself and the outer peripheral surface of the inner ring 3. When filled in the gap by using an injection tool such as a syringe, the magnetic fluid 16 may be retained over the entire circumference due to a magnetic force of each of the magnetic circuits M1 and M2. It may also be possible that the magnet 12 and the pole plate 14 are fixed by magnetic attraction or via an adhesive in combination with magnetic attraction.

Figure 5:
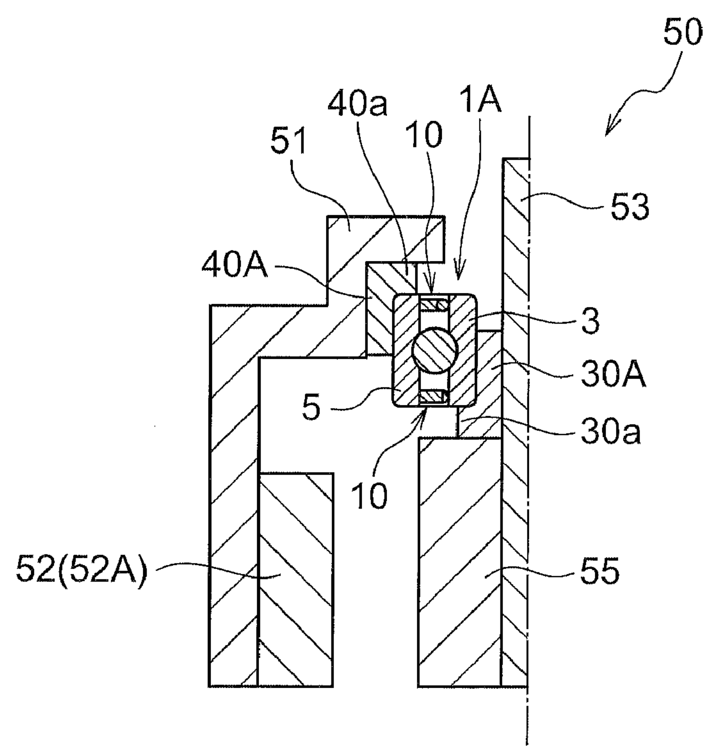
FIG. 5 is a sectional view showing an outline of the drive motor shown in FIG. 4.

A non-magnetic cylindrical inner ring-side support member 30 may be arranged so as to be internally fitted to the inner ring 3. Preferably, the cylindrical inner ring-side support member 30 may have such a length in the axial direction as to protrude from the inner ring 3 in the axial direction so that the inner ring 3 is reliably kept at a moderate distance with respect to a frame (a housing, a casing, or the like). In this embodiment, the inner ring-side support member 30 may be fit and retained over an entire length of an inner peripheral surface of the inner ring 3 and formed to have such a length that one end thereof protrudes from an end portion of the inner ring 3. In this case, it may also be possible that the inner ring-side support member 30 is retained in a state of being fastened to be integrated with the inner ring 3 or retained by being fitted to such an extent that the inner ring-side support member 30 and the inner ring 3 can both slide. Furthermore, it may also be possible that the inner ring-side support member 30 is formed to have such a length that both ends thereof protrude from end portions of the inner ring 3 or, as shown in FIG. 5, one end thereof protrudes from the end portion of the inner ring 3, while the other end thereof ends in a middle portion of the inner ring 3. That is, a fitting length of the inner ring-side support member 30 can be modified as appropriate in accordance with a configuration of a portion (the frame) in which the inner ring-side support member 30 is mounted. A shape of the inner ring-side support member 30 may not be limited to a cylindrical shape and can be modified as appropriate. For example, the inner ring-side support member 30 can be formed in a tubular shape, or an inner surface thereof can be formed in a polygonal shape.

The inner ring-side support member 30 may have a function of, as described above, maintaining a moderate separation distance from the frame when the bearing unit 1 is arranged in a rotary shaft portion, thereby stabilizing the above-described magnetic circuits M1 and M2. That is, when the inner ring 3 is brought to a state where it is directly in contact with the frame (a magnetic material), there may be a possibility that magnetic flux leakage or the like occurs in the magnetic circuits M1 and M2, and thus the magnetic circuits M1 and M2 become no longer stable, so that a retaining state of the magnetic fluid 16 also becomes no longer stable. However, with the above-described inner ring-side support member 30 arranged, the magnetic circuits M1 and M2 can be maintained in a stable state, thus making it possible to exhibit a stable sealing capability. Furthermore, the inner ring-side support member 30 thus configured may be arranged so as to protrude from the inner ring 3 in the axial direction, so that handling ease can be improved, and it may become possible to prevent the magnetic fluid 16 from being dissipated.

Furthermore, the non-magnetic cylindrical outer ring-side support member 40 may be arranged so as to be externally fitted also to the outer ring 5. Preferably, the cylindrical outer ring-side support member 40 may have such a length in the axial direction as to protrude from the outer ring 5 in the axial direction so that the outer ring 5 is reliably kept at a moderate distance with respect to the frame (the housing, the casing, or the like). In this embodiment, the outer ring-side support member 40 may be fit and retained over an entire length of an outer peripheral surface of the outer ring 5 and formed to have such a length that one end thereof protrudes from an end portion of the outer ring 5. In this case, it may also be possible that the outer ring-side support member 40 is retained in a state of being fastened to be integrated with the outer ring 5 or retained by being fitted to such an extent that the outer ring-side support member 40 and the outer ring 5 can both slide. Furthermore, it may also be possible that the outer ring-side support member 40 is formed to have such a length that both ends thereof protrude from end portions of the outer ring 5 or, as shown in FIG. 5, one end thereof protrudes from the end portion of the outer ring 5, while the other end thereof ends in a middle portion of the outer ring 5. That is, a fitting length of the outer ring-side support member 40 can be modified as appropriate in accordance with a configuration of a portion (the frame) in which the outer ring-side support member 40 is mounted. A shape of the outer ring-side support member 40 may not be limited to a cylindrical shape and can be modified as appropriate. For example, the outer ring-side support member 40 can be formed in a tubular shape, or an outer surface thereof can be formed in a polygonal shape.

Similarly to the inner ring-side support member 30, the outer ring-side support member 40 thus configured may have a function of, as described above, maintaining a moderate separation distance from the frame when the bearing unit 1 is arranged in the rotary shaft portion, thereby stabilizing the above-described magnetic circuits M1 and M2. That is, when the outer ring 5 is brought to a state where it is directly in contact with the frame (a magnetic material), there may be a possibility that magnetic flux leakage or the like occurs in the magnetic circuits M1 and M2, and thus the magnetic circuits M1 and M2 become no longer stable, so that a retaining state of the magnetic fluid 16 also becomes no longer stable. However, with the above-described outer ring-side support member 40 arranged, the magnetic circuits M1 and M2 can be maintained in a stable state, thus making it possible to exhibit a stable sealing capability. Furthermore, the outer ring-side support member 40 thus configured may be arranged so as to protrude from the outer ring 5 in the axial direction, so that handling ease can be improved, and it may become possible to prevent the magnetic fluid 16 from being dissipated.

Preferably, the inner ring-side support member 30 and the outer ring-side support member 40 described above may have flanges 30*a* and 40*a* previously formed at protruding end portions thereof, respectively, and abutting against end surfaces of the inner ring 3 and the outer ring 5, respectively. With the flanges 30*a* and 40*a* thus configured formed, when mounted in the frame, the inner ring 3 and the outer ring 5 can be reliably prevented from coming in contact with the frame, so that it becomes easier to maintain the magnetic circuits M1 and M2 in a stable state. Furthermore, with the flanges 30*a* and 40*a* thus configured formed, the magnetic fluid 16 can be reliably prevented from being dissipated due to, for example, contact with any other object, and thus it may become possible to further improve handling ease and incorporation workability as a bearing unit. Moreover, with the flanges 30*a* and 40*a* thus configured formed, when the inner ring-side support member 30 and the outer ring-side support member 40 are fitted to an inner side of the inner ring 3 and an outer side of the outer ring 5, respectively, positioning thereof may be achieved to stabilize a retained state thereof.

It may also be possible that the above-described flanges 30*a* and 40*a* are formed only on one side, respectively. Furthermore, it may be sufficient that the flanges 30*a* and 40*a* have such a length in a radial direction as to be able to cover the end surfaces of the inner ring 3 and the outer ring 5, respectively. It may also be possible, however, that, like the flange 40*a* shown in FIG. 1, the flanges 30*a* and 40*a* are formed to have such a length as to cover the magnetic seal mechanism 10. As described above, the flanges 30*a* and 40*a* may be formed to have such a size as to cover the magnetic seal mechanisms 10, and thus it may become possible to further stabilize a magnetic circuit formed.

A thickness T of each of the inner ring-side support member 30 and the outer ring-side support member 40 may not be particularly limited, and it may be sufficient that the thickness T allows the inner ring 3 and the outer ring 5 to be moderately separated from the frame so that a magnetic circuit formed is prevented from being affected thereby and thus is set to not less than 0.05 mm. In this case, when the support members 30 and 40 have a secured thickness of not less than 0.05 mm, it may also become possible that, by a capillary phenomenon, the magnetic fluid 16 is prevented from being dissipated. Furthermore, with the thickness T increased to some extent, it may also become possible to obtain an effect of blocking magnetism. That is, in a case where the support members 30 and 40 are installed in the rotary shaft portion of a drive motor, the magnetic seal mechanism 10 can be prevented from being affected by magnetism from components of the drive motor, and it may become possible to prevent the components of the drive motor from being affected by magnetism from the magnetic seal mechanism 10.

While the non-magnetic inner ring-side support member 30 and the non-magnetic outer ring-side support member 40 can be made of a metal material such as aluminum or zinc, it may also be possible that they are made of an insulator such as resin or rubber. When such an insulator is used as a material of the inner ring-side support member 30 and the outer ring-side support member 40, it may become possible to effectively suppress a phenomenon in which the inner ring-side support member 30 and the outer ring-side support member 40 corrode due to galvanic corrosion or the like when water or the like adheres thereto. It may also be possible that either one of the inner ring-side support member 30 and the outer ring-side support member 40 is made of such an insulator.

Figure 4:
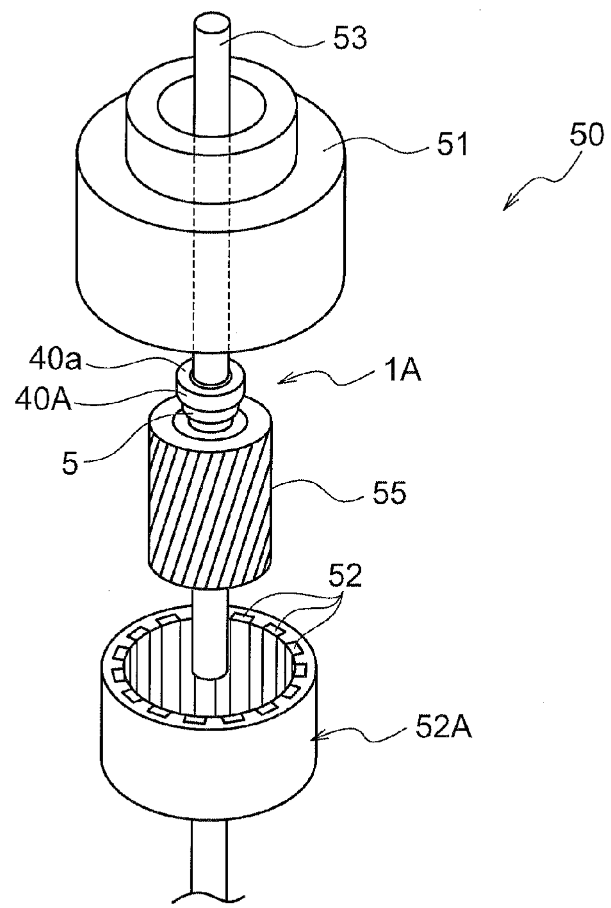
FIG. 4 is a schematic perspective view showing one configuration example of a drive motor.

Next, with reference to FIG. 4 and FIG. 5, a description is given of an embodiment in which a bearing unit 1A having a similar configuration to that of the above-described bearing unit is incorporated into a drive motor. In the embodiment described below, components configured similarly to those in the foregoing embodiment are denoted by the same reference characters, and detailed descriptions thereof are omitted.

FIG. 4 is a schematic perspective view showing one configuration example of the drive motor, and FIG. 5 is a sectional view showing an outline of the drive motor shown in FIG. 4. Components of a drive motor 50 of this embodiment may include a housing 51, a plurality of bar-shaped magnets 52 housed in the housing 51, a rotor 55 having a rotary shaft 53 mounted therein and driven to rotate by an electromagnetic action between itself and the magnets 52, and the bearing unit 1A rotatably supporting the rotary shaft 53.

The magnets 52 may be mounted, as a stator 52A (a permanent magnet type stator), on an inner surface of the housing 51, and the rotor 55 with a wire (a coil) wound thereon may be arranged on an inner side of the magnets 52. The rotary shaft 53 may be mounted in a center portion of the rotor 55 and driven to rotate, together with the rotor 55, by an electromagnetic action between the magnets 52 and the rotor 55.

The bearing unit 1A may support the rotary shaft 53 between itself and motor components so that the rotary shaft 53 is rotatable with respect to the housing 51, and non-magnetic support members 40A and 30A may be arranged between an outer ring 5 and the motor components and between an inner ring 3 and the motor components, respectively. Specifically, the non-magnetic support members (an outer ring-side support member 40A and an inner ring-side support member 30A) may be arranged between the outer ring 5 and the housing 51 and between the inner ring 3 and the rotary shaft 53 together with the rotor 55, respectively.

The outer ring-side support member 40A may have a function of preventing the outer ring 5 from directly coming in contact with the housing 51 as one of the motor components and, similarly to that in the aforementioned embodiment, may be formed in such a cylindrical shape as to be fitted and retained on the outer ring 5. Furthermore, the inner ring-side support member 30A may have a function of preventing the inner ring 3 from directly coming in contact with the rotor 55 as one of the motor components and, similarly to that in the aforementioned embodiment, may be formed in such a cylindrical shape as to be fitted and retained on the inner ring 3. That is, the inner ring 3 and the outer ring 5 may rotatably support the rotary shaft 53 while a moderate separation distance from the motor components is maintained by their respective support members 30A and 40A, respectively, and thus in no case is a magnetic circuit of a magnetic seal mechanism 10 affected by the motor components, so that it may become possible to exhibit a stable sealing capability.

Configurations of the outer ring-side support member 40A and the inner ring-side support member 30A in terms of a shape, a thickness, a length in an axial direction, and the like can be modified as appropriate in accordance with components of the drive motor, respective shapes of the components, a location where the bearing unit 1A is arranged, or the like. Furthermore, similarly to the aforementioned embodiment, it may also be possible that the support members 40A and 30A are made of an insulator.

As thus described, according to the drive motor into which the magnetic fluid sealed bearing unit is incorporated, it may be possible to reliably prevent foreign substances from entering a bearing portion arranged on a rotary shaft, thus making it possible to obtain stable sealing performance. Furthermore, as mentioned above, handling of the bearing unit may be facilitated by, for example, filling a magnetic fluid beforehand, and thus may become possible to easily incorporate the bearing unit into a housing.

The above-described structures of the drive motor (structures of the stator, the rotor, the housing, and so on) can be variously modified, and correspondingly therewith, the configurations of the support members of the bearing unit can also be modified as appropriate. For example, it may also be possible that a coil is mounted on an inner surface of the housing, and magnets are mounted on the rotor. As for an internal structure of the drive motor, there may be no limitation to any particular configuration. Furthermore, the above-described drive motor can be used as a drive source of a device used in a harsh use environment, such as, for example, an electric reel, a drone, an electric vehicle, an air-cooling fan, or the like.

While the foregoing has described the embodiments of the present invention, the present invention may not be limited to the above-described embodiments and can be modified as appropriate.

The present invention may be characterized by support members arranged respectively in an outer ring portion and an inner ring portion of a bearing unit into which a magnetic seal mechanism is incorporated. As long as the magnetic seal mechanism is configured so that a magnetic circuit is formed at an inner ring or in a gap between itself and the inner ring, and a magnetic fluid is retained, so that foreign substances are prevented from entering inside, there may be no limitation on a configuration thereof (an internal configuration of a magnet or a pole plate or the like). Furthermore, it may also be possible that the bearing unit has a configuration in which only either one of the outer ring-side support member and the inner ring-side support member is arranged. Moreover, as for a retaining state of the bearing unit, it may be sufficient that a magnetic sealed bearing is retained in a handleable unit state such as by pressing, with a force of a certain strength, i.e., forcibly inserting the magnetic sealed bearing between the outer ring-side support member and the inner ring-side support member, by seamlessly fitting the magnetic sealed bearing therebetween, or by fitting and bonding the magnetic sealed bearing therebetween, and a unit retaining method may be set as appropriate.

What is claimed is:

1. A magnetic fluid sealed bearing unit, comprising:

an inner ring and an outer ring, each formed of a magnetic material;

a plurality of rolling members interposed between the inner ring and the outer ring;

a magnetic seal mechanism arranged between the inner ring and the outer ring and configured to inhibit entry of foreign substances toward the plurality of rolling members;

a non-magnetic inner ring-side support member fitted and retained on an inner peripheral surface of the inner ring;

and a non-magnetic outer ring-side support member fitted and retained on an outer peripheral surface of the outer ring, wherein at least one of the non-magnetic inner ring-side support member and the non-magnetic outer ring-side support member has a flange formed thereon, the flange abutting against an end surface of a corresponding one of the inner ring and the outer ring in a state where the at least one of the non-magnetic inner ring-side support member and the non-magnetic outer ring-side support member is fitted and retained.

2. The magnetic fluid sealed bearing unit according to claim 1, wherein at least one of the non-magnetic inner ring-side support member and the non-magnetic outer ring-side support member is made of an insulator.

3. The magnetic fluid sealed bearing unit according to claim 1, wherein the non-magnetic inner ring-side support member and the non-magnetic outer ring-side support member are each formed in a cylindrical shape.

4. A drive motor, comprising a motor component, the motor component including:

a housing;

a magnet housed in the housing;

a rotor driven to rotate by an electromagnetic action between itself and the magnet and having a rotary shaft mounted therein; and a bearing rotatably supporting the rotary shaft, wherein the bearing is formed of the magnetic fluid sealed bearing unit, the magnetic fluid sealed bearing unit comprising:

an inner ring and an outer ring, each formed of a magnetic material;

a plurality of rolling members interposed between the inner ring and the outer ring;

a magnetic seal mechanism arranged between the inner ring and the outer ring and configured to inhibit entry of foreign substances toward the plurality of rolling members;

a non-magnetic inner ring-side support member fitted and retained on the inner ring; and a non-magnetic outer ring-side support member fitted and retained on the outer ring, the non-magnetic outer ring-side support member is arranged between the outer ring and the housing; and the non-magnetic inner ring-side support member is arranged between the inner ring and the rotary shaft.

5. The drive motor according to claim 4, wherein the inner ring-side support member is in contact with the rotor.

6. The drive motor according to claim 5, wherein a flange of the inner ring-side support member is in contact with the rotor.

* * * * *